US012480605B2

(12) United States Patent
Imamura et al.

(10) Patent No.: US 12,480,605 B2
(45) Date of Patent: Nov. 25, 2025

(54) TUBE, METHOD FOR PRODUCING TUBE, AND METHOD FOR STORING TUBE

(71) Applicant: DAIKIN INDUSTRIES, LTD., Osaka (JP)

(72) Inventors: Hitoshi Imamura, Osaka (JP); Hiroyuki Hamada, Osaka (JP); Eri Mukai, Osaka (JP); Yuuki Kuwajima, Osaka (JP); Manabu Fujisawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 873 days.

(21) Appl. No.: 17/673,374

(22) Filed: Feb. 16, 2022

(65) Prior Publication Data

US 2022/0170573 A1     Jun. 2, 2022

Related U.S. Application Data

(63) Continuation of application No. PCT/JP2020/029884, filed on Aug. 4, 2020.

(30) Foreign Application Priority Data

Aug. 21, 2019    (JP) .................................. 2019-150911

(51) Int. Cl.
*F16L 11/06*      (2006.01)
*B29C 48/00*      (2019.01)
(Continued)

(52) U.S. Cl.
CPC ............ *F16L 11/06* (2013.01); *B29C 48/022* (2019.02); *B29C 48/09* (2019.02); *B29C 48/274* (2019.02);
(Continued)

(58) Field of Classification Search
CPC ......... F16L 11/04; F16L 11/06; B29C 48/022; B29C 48/09; B29C 48/274; B29C 48/32;
(Continued)

(56) References Cited

U.S. PATENT DOCUMENTS 5,473,018 A    12/1995   Namura et al.
5,603,999 A    2/1997   Namura et al.
(Continued)

FOREIGN PATENT DOCUMENTS

CN          1464543 A      12/2003
JP           58-160135 A     9/1983
(Continued)

OTHER PUBLICATIONS

Partial Supplementary European Search Report issued Sep. 1, 2023 in European Application No. 20854340.5.
(Continued)

*Primary Examiner* — Yan Lan
(74) *Attorney, Agent, or Firm* — Sughrue Mion, PLLC (57) ABSTRACT

Provided is a tube comprising a tetrafluoroethylene/fluoroalkyl vinyl ether copolymer, wherein the tube inner surface has a surface roughness Ra of 5 nm or less measured by atomic force microscopy (AFM) with an evaluation length set to 3 μm, and the tube has an amount of metals eluted from the tube inner surface of 0.30 ng/cm² or less.

10 Claims, 9 Drawing Sheets

(51) Int. Cl.
  *B29C 48/09* (2019.01)
  *B29C 48/27* (2019.01)
  *B29C 48/32* (2019.01)
  *B29D 23/00* (2006.01)
  *C08F 214/26* (2006.01)
  *B29C 48/69* (2019.01)
  *B29C 48/86* (2019.01)
  *B29C 48/92* (2019.01)
  *B29K 27/18* (2006.01)
  *B29K 105/00* (2006.01)
  *B29L 23/00* (2006.01)
  *C08J 5/00* (2006.01)
  *C08L 27/18* (2006.01)

(52) U.S. Cl.
  CPC .............. *B29C 48/32* (2019.02); *B29D 23/00* (2013.01); *B29D 23/001* (2013.01); *C08F 214/262* (2013.01); *B29C 48/69* (2019.02); *B29C 48/865* (2019.02); *B29C 48/92* (2019.02); *B29C 2948/92704* (2019.02); *B29C 2948/92904* (2019.02); *B29K 2027/18* (2013.01); *B29K 2105/0085* (2013.01); *B29K 2995/0072* (2013.01); *B29L 2023/00* (2013.01); *C08J 5/00* (2013.01); *C08J 2327/18* (2013.01); *C08L 27/18* (2013.01)

(58) Field of Classification Search
  CPC ....... B29C 48/69; B29C 48/865; B29C 48/92; B29C 2948/92704; B29C 2948/92904; B29C 48/29; B29D 23/00; B29D 23/001; B29K 2027/18; B29K 2105/0085; B29K 2995/0072; B29L 2023/00; C08J 2327/18; C08J 5/00; C08L 27/18
  See application file for complete search history.

(56) References Cited

U.S. PATENT DOCUMENTS

| | | | |
|---|---|---|---|
| 2003/0013791 A1* | 1/2003 | Blong | C08F 214/262 526/89 |
| 2008/0081139 A1 | 4/2008 | Iwahara et al. | |
| 2020/0139604 A1* | 5/2020 | Yabe | B29C 48/022 |

FOREIGN PATENT DOCUMENTS

| | | |
|---|---|---|
| JP | 61-159589 A | 7/1986 |
| JP | 7-70397 A | 3/1995 |
| JP | 8-245723 A | 9/1996 |
| JP | 10-086205 A | 4/1998 |
| JP | 11-217478 A | 8/1999 |
| JP | 2000-233435 A | 8/2000 |
| JP | 2001-247627 A | 9/2001 |
| JP | 2001-356627 A | 12/2001 |
| JP | 2004-249606 A | 9/2004 |
| JP | 2008-105401 A | 5/2008 |
| JP | 2010-125634 A | 6/2010 |
| JP | 2017-214478 A | 12/2017 |
| JP | 2019-6983 A | 1/2019 |
| KR | 10-1998-0044886 A | 9/1998 |
| WO | 2014/054685 A1 | 4/2014 |

OTHER PUBLICATIONS

Extended European Search Report issued Dec. 5, 2023 in corresponding European Application No. 20854340.5.

International Search Report for PCT/JP2020/029884 dated Oct. 20, 2020.

International Preliminary Report on Patentability with the translation of Written Opinion dated Feb. 17, 2022 from the International Bureau in International Application No. PCT/JP2020/029884.

* cited by examiner

TUBE, METHOD FOR PRODUCING TUBE, AND METHOD FOR STORING TUBE

CROSS-REFERENCE TO RELATED APPLICATIONS

This application is a Rule 53(b) Continuation of International Application No. PCT/JP2020/029884 filed Aug. 4, 2020, which claims priority based on Japanese Patent Application No. 2019-150911 filed Aug. 21, 2019, the respective disclosures of which are incorporated herein by reference in their entirety.

TECHNICAL FIELD

The present disclosure relates to a tube, a method for producing a tube, and a method for storing a tube.

BACKGROUND ART

In Patent Document 1, a melt-formable tetrafluoroethylene/fluoroalkoxytrifluoroethylene copolymer composition containing polytetrafluoroethylene having a crystallization temperature of 305° C. or more and a heat of crystallization of 50 J/g or more is described.

CITATION LIST

Patent Literature

Patent Literature 1: Japanese Patent Laid-Open No. 7-70397

SUMMARY

The present disclosure provides a tube containing a tetrafluoroethylene/fluoroalkyl vinyl ether copolymer, wherein the tube inner surface has a surface roughness Ra of 5 nm or less measured by atomic force microscopy (AFM) with an evaluation length set to 3 µm, and the tube has an amount of metals eluted from the tube inner surface of 0.30 ng/cm$^2$ or less.

Effects

The present disclosure enables to provide a tube having a smooth tube inner surface and allowing only a small amount of metals eluted.

DESCRIPTION OF EMBODIMENTS

Specific embodiments of the present disclosure are described in detail as follows, thought the present disclosure is not limited to the following embodiments.

A tube of the present disclosure has an inner surface with a surface roughness Ra of 5 nm or less measured by atomic force microscopy (AFM) with an evaluation length set to 3 µm. The present inventors have found that the appropriate adjustment of the surface roughness Ra of the tube inner surface allows the amount of metals eluted to be reduced, on which no attention has been focused so far. In addition, it has been found that miniaturization of spherulites appearing in the tube inner surface does not enable to reduce the amount of metals eluted to a level required in the field of recent semiconductor device manufacturing.

Figure 1:
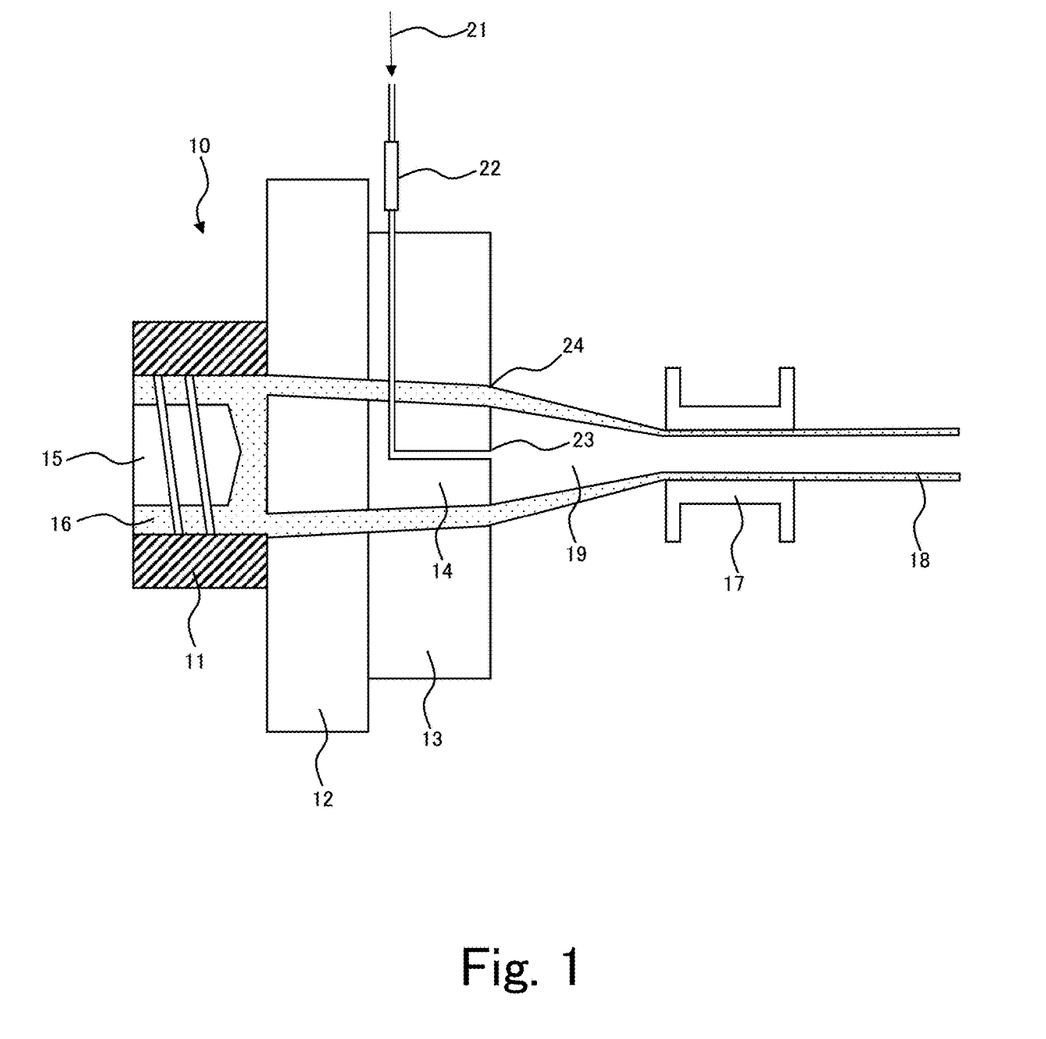
FIG. 1 is a schematic cross-sectional view showing an example of an extrusion molding of TFE/FAVE copolymer using an extruder.

Usually, a tube containing a tetrafluoroethylene (TFE)/fluoroalkyl vinyl ether (FAVE) copolymer (TFE/FAVE copolymer) is produced by extrusion of the TFE/FAVE copolymer by using an extruder. FIG. 1 is a schematic cross-sectional view showing an example of an extrusion molding of TFE/FAVE copolymer using an extruder. The extruder 10 shown in FIG. 1 has a cylinder 11, an adaptor 12, a die head 13 and a die tip 14. As shown in FIG. 1, during extrusion, a TFE/FAVE copolymer 16 is melted in the cylinder 11, and extruded from the die head 13 and the die tip 14 by the rotation of a screw 15. The extruded TFE/FAVE copolymer in a tubular state passes through a sizing die 17, so that the external form thereof is defined. On the other hand, the inner surface of the extruded TFE/FAVE copolymer in a tubular state is naturally cooled without any contact with a component such as the die. As a result, in the tube inner surface 18, irregularities with a hexagonal pattern resulting from spherulites formed by crystallization of the TFE/FAVE copolymer during cooling appear.

The surface roughness Ra of a tube for transporting a high-purity chemical solution for manufacturing a semiconductor device has been measured in accordance with a standard such as JIS standard and SEMI standard, so far. In these standards, however, the evaluation length of the roughness curve in measurement of the surface roughness Ra is larger than the size of spherulites appearing in the tube inner surface. For example, in SEMI F57-0314, the surface roughness Ra of the tube inner surface is described as follows: Ra≤0.25 µm (250 nm). The evaluation length in measurement of the surface roughness Ra is defined depending on the size of surface roughness Ra. As described in Journal of Japan Society for Precision Engineering Vol. 78, No. 4, 2012 (pp 301 to 304), the evaluation length depending on the size of surface roughness Ra is as follows.

| | |
|---|---|
| 0.1 < Ra ≤ 2 | Evaluation length: 4 mm |
| 0.02 < Ra ≤ 0.1 | Evaluation length: 1.25 mm |
| (0.006) < Ra ≤ 0.02 | Evaluation length: 0.4 mm |

Patent Document 1 describes that spherulites of a molded article made by normal melt extrusion have a diameter of approximately 20 to 150 µm. Patent Document 1 proposes to control the average size of recrystallized spherulites of a molded article to 15 µm or less, and the average size of recrystallized spherulites of a test piece prepared in the Example is 2 µm at the minimum. Accordingly, the surface roughness determined by setting an evaluation length of a roughness curve to 0.4 to 4 mm (400 to 4000 nm) is greatly affected by the size of spherulites. In other words, the surface roughness determined under conventional measurement conditions corresponds to a swelling of a hexagonal pattern resulting from spherulites appearing in the tube inner surface. On the other hand, a recent semiconductor electronic circuit has a line width of several nanometers, indicating that nano-size particles affect product yields.

The present inventors have found that the undesirable product yields affected by nano-size particles are caused by extremely fine irregularities in the tube inner surface. According to the present inventors, it has been found that the boundary between spherulites is flat and smooth free from "deep groove" as described in Patent Document 1. Accordingly, it is unlikely that nano-size particles adhere to the boundary between spherulites concentratedly. On the other hand, the present inventors have measured the surface roughness Ra with an evaluation length in a roughness curve of 3 µm, and have found that irregularities far smaller than the size of spherulites in the surface exist on the spherulite surface. These fine irregularities present on the inner surface of a conventional tube has a sufficient size for nano-size particles to penetrate into.

The number of nano-size particles (for example, 5 nm or less) adhering to the tube inner surface cannot be measured by the current technology. For example, the particle size detectable by a particle counter is approximately 20 to 30 nm. However, according to the study by the present inventors, it has been found that the surface roughness Ra measured for the evaluation length set to 3 µm is correlated with the amount of metals eluted. It is presumed that a part of contaminants such as particles contains metal components. Accordingly, through measurement of the amount of metals eluted into nitric acid aqueous solution from the tube inner surface, the amount of contaminants such as nano-size particles adhering to the tube inner surface can be presumed.

The tube of the present disclosure has an inner surface with a surface roughness Ra of 5 nm or less measured by atomic force microscopy (AFM) with an evaluation length set to 3 µm. Through such adjustment of the surface roughness Ra of the tube inner surface at a nano level, the amount of metals eluted from the tube inner surface to nitric acid aqueous solution can be reduced, so that the adhesion of contaminants such as nano-size particles to the tube inner surface can be suppressed.

The surface roughness Ra of the tube inner surface is 5 nm or less, more preferably 4 nm or less, and still more preferably 3 nm or less. A smaller surface roughness Ra is more preferred from the viewpoint of further reducing the amount of metals eluted, and the lower limit may be 0.1 nm or more, or 1 nm or more, though not particularly limited.

The surface roughness Ra of the tube inner surface may be adjusted by a method of appropriately selecting the type of FAVE unit in a TFE/FAVE copolymer and a method of appropriately adjusting the content of a FAVE unit. The present inventors found that the spherulite size does not affect the surface roughness Ra of the tube inner surface of a tube of the present disclosure.

The tube of the present disclosure has an amount of metals eluted from the tube inner surface of 0.30 $ng/cm^2$ or less, preferably 0.25 $ng/cm^2$ or less, more preferably 0.20 $ng/cm^2$ or less, still more preferably 0.15 $ng/cm^2$ or less, and, for example, 0.13 $ng/cm^2$ or less. A smaller amount of metals eluted from the tube inner surface is more preferred, and the lower limit may be 0 $ng/cm^2$ or more, 0.01 $ng/cm^2$ or more, or 0.08 $ng/cm^2$ or more, though not particularly limited.

Further, the tube of the present disclosure has an amount of Ca eluted from the tube inner surface of 0.15 $ng/cm^2$ or less, preferably 0.09 $ng/cm^2$ or less, more preferably 0.08 $ng/cm^2$ or less, and still more preferably 0.07 $ng/cm^2$ or less.

In the present disclosure, the amount of metals eluted from the tube inner surface can be identified through measurement of the total content of Na, Mg, Al, K, Ca and Fe in nitric acid aqueous solution by inductively coupled plasma mass spectrometry (ICP-MS). A 5 mass % nitric acid aqueous solution is enclosed in a tube having the inner surface cleaned with ultrapure water in advance, and left standing at room temperature for 4 hours as measurement sample used in ICP-MS.

Among the metal species to be measured, Na, Mg, Al, K and Ca are components contained likely in contaminants in the air (atmosphere), not being components generated from an apparatus used in the production process of the TFE/FAVE copolymer or components generated from a molding machine for molding the TFE/FAVE copolymer. Further, Fe is one of the main metals contained in the air. Accordingly, through measurement of the content of Na, Mg, Al, K, Ca and Fe in the nitric acid aqueous solution, the amount of contaminants adhering to the inner surface of a tube can be evaluated. Even in the case where these metals are contained in the internal part of the tube (internal part of resin), the detection thereof can be minimized by setting the resting time after filling nitric acid aqueous solution in the tube to 4 hours.

The amount of metals eluted from the tube inner surface can be reduced by appropriately adjusting the surface roughness Ra of the tube inner surface and flowing a gas which has passed through a filter in the hollow part of the tube extruded from the die equipped in an extruder during production of a tube by extrusion molding of a TFE/FAVE copolymer. Also, the amount of metals eluted from the tube inner surface can be further easily reduced by adjusting the maximum height Rp-V of the tube inner surface in addition to the adjustment of the surface roughness Ra of the tube inner surface.

In the tube of the present disclosure, the tube inner surface has an average spherulite size of preferably 1 to 150 µm, more preferably 2 to 120 µm.

Since the tube of the present disclosure has extremely small surface roughness Ra of the tube inner surface as described above, contaminants barely adhere to the tube inner surface, even when the tube inner surface has an average spherulite size of more than 15 µm. Even if contaminants adhere to the tube inner surface, the contaminants can be easily removed. In particular, it is presumed that difficulty in removal of particulate contaminants penetrating into concave portions present in the rough inner surface of a tube as in the case with a conventional tube barely occurs. Even in the case where particulate contaminants penetrate into concave portions, such contaminants are limited to extremely small ones, so that it is presumed that the effect of contaminants can be more suppressed in comparison with conventional tubes. As described above, in the tube of the present disclosure, miniaturization of the spherulite size is not required, so that the tube of the present disclosure may contain a nucleating agent used in miniaturization of the spherulite size of polytetrafluoroethylene (PTFE) or may not contain the same.

The PTFE is not particularly limited. Examples thereof include a PTFE having a crystallization temperature of 305° C. or more measured by differential scanning calorimeter (DSC), and the PTFE may have a crystallization heat of 50 J/g or more. By containing such a PTFE, the tube of the present disclosure can have a smoother inner surface. The crystallization temperature is more preferably 310° C. or more, still more preferably 312° C. or more.

The PTFE may be modified or may not be modified. Examples thereof include a homopolymer of tetrafluoroethylene (TFE), and a modified PTFE containing a very small amount, i.e. less than 1 wt %, of a modifying agent such as hexafluoropropylene (HFP), fluoroalkoxytrifluoroethylene, fluoroalkylethylene, and chlorotrifluoroethylene.

The molecular weight of PTFE is not particularly limited, and a low molecular weight PTFE may be used. In comparison with a usual PTFE having a number average molecular weight of several millions, the low molecular weight PTFE has a lower molecular weight. The low molecular weight PTFE can be produced by a known method such as polymerization of TFE in the presence of a chain transfer agent, and pyrolysis or radiolysis of molding powder, fine powder or molded product thereof.

The tube of the present disclosure may contain the PTFE in an amount in the range not impairing the effect of the present disclosure. The tube of the present disclosure may contain PTFE in an amount of, for example, 0.01 wt % or more and 10 wt % or less, preferably 0.01 wt % or more and 4 wt % or less.

In the tube of the present disclosure, the tube inner surface has a maximum spherulite size of preferably 2 to 160 μm, more preferably 3 to 130 μm. The tube of the present disclosure has extremely small surface roughness Ra of the tube inner surface as described above, contaminants barely adhere to the tube inner surface, even when the tube inner surface has a maximum spherulite size of more than 20 μm. Even if contaminants adhere to the tube inner surface, the contaminants can be easily removed.

The tube of the present disclosure contains a tetrafluoroethylene/fluoroalkyl vinyl ether copolymer.

The tetrafluoroethylene (TFE)/fluoroalkyl vinyl ether (FAVE) copolymer (TFE/FAVE copolymer) is preferably a melt-fabricable fluororesin. In the present disclosure, the melt-fabricability means that a polymer can be melted and processed by using a conventional processing machine such as an extruder and an injection molding machine. Accordingly, the melt-fabricable fluororesin usually has a melt flow rate of 0.01 to 500 g/10 min measured by the measurement method described below.

The content of the FAVE unit in the TFE/FAVE copolymer relative to the total monomer units is preferably 1.0 to 10 mass %, more preferably 2.0 mass % or more, still more preferably 3.0 mass % or more, particularly preferably 3.5 mass % or more, and more preferably 8.0 mass % or less, still more preferably 7.0 mass % or less, particularly preferably 6.5 mass % or less, and most preferably 6.0 mass % or less.

The content of the TFE unit in the TFE/FAVE copolymer relative to the total monomer units is preferably 90 to 99.0 mass %, more preferably 92.0 mass % or more, still more preferably 93.0 mass % or more, particularly preferably 93.5 mass % or more, most preferably 94.0 mass % or more, and more preferably 98.0 mass % or less, still more preferably 97.0 mass % or less, and particularly preferably 96.5 mass % or less.

The amount of each of the monomer units in the TFE/FAVE copolymer is measured by $^{19}$F-NMR method.

Examples of FAVE that constitutes the FAVE unit include at least one selected from the group consisting of:

a monomer represented by a general formula (1):

$$CF_2=CFO(CF_2CFY^1O)_p-(CF_2CF_2CF_2O)_q-R^f \qquad (1)$$

wherein $Y^1$ represents F or $CF_3$, and $R^f$ represents a perfluoroalkyl group having 1 to 5 carbon atoms; p represents an integer of 0 to 5, and q represents an integer of 0 to 5, and a monomer represented by a general formula (2):

$$CFX=CXOCF_2OR^1 \qquad (2)$$

wherein X represents H, F or $CF_3$, being the same or different, and $R^1$ represents a linear or branched fluoroalkyl group having 1 to 6 carbon atoms, which may contain 1 to 2 atoms of at least one type of atom selected from the group consisting of H, Cl, Br and I, or a cyclic fluoroalkyl group having 5 or 6 carbon atoms, which may contain 1 to 2 atoms of at least one type of atom selected from the group consisting of H, Cl, Br and I.

In particular, a monomer represented by the general formula (1) is preferred as FAVE, at least one selected from the group consisting of perfluoro(methyl vinyl ether), perfluoro(ethyl vinyl ether) (PEVE) and perfluoro(propyl vinyl ether) (PPVE) is more preferred, and PPVE is still more preferred. Use of PPVE as FAVE allows the surface roughness Ra of the tube inner surface to be easily adjusted in the range described above. For example, by using PPVE as FAVE, even with a comparatively small content of the PPVE unit in the copolymer, the surface roughness Ra of the tube inner surface can be easily adjusted in the range described above. On the other hand, use of PEVE as FAVE makes it difficult to adjust the surface roughness Ra of the tube inner surface in the range described above, even with a comparatively large content of the PEVE unit in the copolymer. Use of PPVE as FAVE is preferred also from the viewpoints of heat resistance, resistance to chemical solution, and crack resistance of the tube.

The TFE/FAVE copolymer is not particularly limited, and a copolymer having a molar ratio between TFE unit and FAVE unit (TFE unit/FAVE unit) of 70/30 or more and less than 99/1 is preferred. The more preferred molar ratio is 70/30 or more and 98.9/1.1 or less, and the still more preferred molar ratio is 80/20 or more and 98.9/1.1 or less. With a too small amount of TFE unit, mechanical properties tend to decrease, and with a too large amount, the melting point increases too high, so that the moldability tends to decrease.

The TFE/FAVE copolymer is also preferably a copolymer having 0.1 to 10 mol % of a monomer unit derived from a monomer copolymerizable with TFE and FAVE, and 90 to 99.9 mol % in total of TFE unit and FAVE unit.

Examples of the monomer copolymerizable with TFE and FAVE include HFP, a vinyl monomer represented by $CZ^3Z^4\!=\!CZ^3(CF_2)_nZ^6$, wherein $Z^3$, $Z^4$ and $Z^5$ represent H or F, being the same or different; $Z^6$ represents H, F or Cl; and n represents an integer of 2 to 10; an alkyl perfluoro vinyl ether derivative represented by $CF_2\!=\!CF\!-\!OCH_2\!-\!Rf^7$, wherein $Rf^7$ represents a perfluoroalkyl group having 1 to 5 carbon atoms; and the like. In particular, HFP is preferred.

As the TFE/FAVE copolymer, at least one selected from the group consisting of a copolymer composed of TFE units and FAVE units only and the TFE/HFP/FAVE copolymer is preferred, and a copolymer composed of TFE units and FAVE units only is more preferred.

The melting point of the TFE/FAVE copolymer is preferably 280 to 322° C., more preferably 290° C. or more, still more preferably 295° C. or more, particularly preferably 300° C. or more, and more preferably 315° C. or less. The melting point may be measured by a differential scanning calorimeter (DSC).

The glass transition temperature (Tg) of the TFE/FAVE copolymer is preferably 70 to 110° C., more preferably 80° C. or more, and more preferably 100° C. or less. The glass transition temperature may be measured by dynamic viscoelasticity measurement.

The melt flow rate (MFR) of the TFE/FAVE copolymer at 372° C. is preferably 0.1 to 100 g/10 min, more preferably 0.5 g/10 min or more, still more preferably 1 g/10 min or more, and more preferably 80 g/10 min or less, still more preferably 40 g/10 min or less, and particularly preferably 30 g/10 min or less. The MFR is a value obtained as a mass of polymer (g/10 min) flowing out from a nozzle with an inner diameter of 2.1 mm and a length of 8 mm under a load of 5 kg at 372° C. with use of a melt indexer (manufactured by Yasuda Seiki Seisakusho, Ltd.) in accordance with ASTM D1238.

As the TFE/FAVE copolymer, a copolymer having a small number of functional groups is preferred to further reduce the amount of metals eluted of the resulting tube. In other words, the copolymer preferably has 0 to 50 functional groups in total per $10^6$ carbon atoms. The number of functional groups per $10^6$ carbon atoms is more preferably 0 to 30, and still more preferably 0 to 15.

The functional group is a functional group present at the main chain end or side chain end of the TFE/FAVE copolymer, and a functional group present in the main chain or side chain. As the functional group, at least one selected from the group consisting of $-\!CF\!=\!CF_2$, $-\!CF_2H$, $-\!COF$, $-\!COOH$, $-\!COOCH_3$, $-\!CONH_2$ and $-\!CH_2OH$ is preferred.

For identification of the type of the functional group and measurement of the number of functional groups, infrared spectroscopy may be used.

Specifically, the number of functional groups is measured by the following method. First, the TFE/FAVE copolymer is melted at 330 to 340° C. for 30 minutes, and subjected to compression molding to prepare a film having a thickness of 0.25 to 0.3 mm. The film is analyzed by Fourier-transform infrared spectroscopy to obtain an infrared absorption spectrum of the TFE/FAVE copolymer. A difference spectrum from the base spectrum for absence of functional group through complete fluorination is then obtained. From the absorption peak of a specific functional group appearing in the difference spectrum, the number of functional groups N per $1 \times 10^6$ carbon atoms in the TFE/FAVE copolymer is calculated according to the following formula (A).

$$N = I \times K / t \quad (A)$$

I: absorbance
K: correction coefficient
t: thickness of film (mm)

For reference, absorption frequency, coefficient of molar absorbance and correction coefficient of the functional groups in the present disclosure are shown in Table 1. The coefficient of molar absorbance is determined from the FT-IR measurement data of a low molecular weight model compound.

TABLE 1

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{16}COF$ |
| —CCOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$CH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

The absorption frequencies of $-\!CH_2CF_2H$, $-\!CH_2COF$, $-\!CH_2COOH$, $-\!CH_2COOCH_3$ and $-\!CH_2CONH_2$ are lower than the absorption frequencies of $-\!CF_2H$, $-\!COF$, $-\!COOH$ free and $-\!COOH$ bonded, $-\!COOCH_3$, and $-\!CONH_2$ shown in the table, respectively, by several tens of kayser (cm$^{-1}$).

Accordingly, the number of functional group of $-\!COF$ is a total of the number of functional group determined from the absorption peak at an absorption frequency of 1883 cm$^{-1}$ due to $-\!CF_2COF$, and the number of functional group determined from the absorption peak at an absorption frequency of 1840 cm$^{-1}$ due to $-\!CH_2COF$.

The number of functional group may be a total number of $-\!CF\!=\!CF_2$, $-\!CF_2H$, $-\!COF$, $-\!COOH$, $-\!COOCH_3$, $-\!CONH_2$ and $-\!CH_2OH$.

The functional group is introduced into the TFE/FAVE copolymer by, for example, a chain transfer agent or a polymerization initiator used in production of the TFE/FAVE copolymer. For example, in the case where an alcohol is used as chain transfer agent, or a peroxide having a $-\!CH_2OH$ structure is used as polymerization initiator, $-\!CH_2OH$ is introduced at the main chain end of the TFE/FAVE copolymer. Alternatively, due to polymerization of a monomer having a functional group, the functional group is introduced at the side chain end of the TFE/FAVE copolymer.

By subjecting the TFE/FAVE copolymer having such a functional group to fluorination treatment, the TFE/FAVE copolymer having the functional group in the above range of numbers can be obtained. In other words, the TFE/FAVE copolymer is preferably subjected to fluorination treatment. Further, the TFE/FAVE copolymer preferably has a —$CF_3$ terminal group.

The fluorination treatment may be performed by contacting a TFE/FAVE copolymer without subjected to fluorination treatment with a fluorine-containing compound.

Examples of the fluorine-containing compound include a fluorine radical source that generates a fluorine radical under fluorination treatment conditions, though not particularly limited. Examples of the fluorine radical source include $F_2$ gas, $CoF_3$, $AgF_2$, $UF_6$, $OF_2$, $N_2F_2$, $CF_3OF$, a halogen fluoride (for example, $IF_5$ and $ClF_3$) and the like.

Although the fluorine radical source such as $F_2$ gas may be one having 100% concentration, the source is preferably diluted to 5 to 50 mass % for use by mixing with an inert gas, and more preferably diluted to 15 to 30 mass % for use, from a safety point of view. Examples of the inert gas include nitrogen gas, helium gas, argon gas, and the like, and nitrogen gas is preferred from the viewpoint of economy.

The fluorination treatment conditions are not particularly limited. Although a TFE/FAVE copolymer in a melted state may be contacted with a fluorine-containing compound, usually the treatment may be performed at the melting point of the TFE/FAVE copolymer or lower, preferably at a temperature of 20 to 220° C., more preferably at a temperature of 100 to 200° C. The fluorination treatment is performed usually for 1 to 30 hours, preferably for 5 to 25 hours. The fluorination treatment is preferably performed by contacting a TFE/FAVE copolymer which has not been subjected to fluorination treatment, with fluorine gas ($F_2$ gas).

The TFE/FAVE copolymer may be produced by, for example, a known conventional method including appropriately mixing a monomer to make the constituent unit thereof and additives such as a polymerization initiator, and performing emulsion polymerization or suspension polymerization.

The tube of the present disclosure is preferably obtained by extruding the TFE/FAVE copolymer, while flowing a gas which has passed through a filter having a filtration accuracy of 5 nm or less into the hollow part of the tube extruded from the die equipped in an extruder. The present disclosure also relates to a method for producing the tube including extruding the TFE/FAVE copolymer from the die, while flowing a gas which has passed through a filter having a filtration accuracy of 5 nm or less into the hollow part of a tube extruded from the tip of the die equipped in an extruder.

By flowing a gas which has passed through a filter having a filtration accuracy of 5 nm or less into the hollow part of a tube extruded from the die equipped in an extruder, the contamination of the tube inner surface caused by contaminants in the air is suppressed, so that the amount of metals eluted from the tube inner surface can be reduced.

The method for flowing a gas which has passed through a filter into the hollow part of a tube is described in more detail with reference to FIG. 1. As shown in FIG. 1, a TFE/FAVE copolymer 16 melted in a cylinder 11 is extruded from a die head 13 and a die tip 14 of an extruder 10. The die tip 14 is provided with a gas inlet 23 such that a gas 21 is introduced into a hollow part 19 of the tubular TFE/FAVE copolymer 16. The gas (external air) 21 which has passed through a filter 22 is introduced into the hollow part 19 through the gas inlet 23. Since the gas thus introduced into the hollow part contains no contaminants having a relatively large particle size, adherence of contaminants having a relatively large particle size to a tube inner surface 18 can be prevented.

Since the filter 22 with a too small filtration accuracy has disadvantages such as excessive increase in air resistance and frequent clogging in the filter 22 caused by contaminants in the gas 21, the filtration accuracy of the filter is preferably 1 nm or more. Although one filter is used in FIG. 1, a gas which has passed through a plurality of filters connected in series may be used, or a gas which has passed through a plurality of filters having a different filtration accuracy may be used. In order to reduce the gas resistance, the filters may be installed in parallel. Alternatively, a gas pressurized by means such as an air pump may allow to be passed through a filter, or a gas accommodated in a high-pressure gas cylinder may be adjusted to an appropriate pressure for passing through a filter. Although in FIG. 1, a gas is introduced into the hollow part 19 from the extruder 10, a gas that has passed through a filter may be introduced from the end of the tube that has passed through a sizing die 17 so as to be evacuated from any place of the extruder 10. Although a single screw extruder is used in FIG. 1, a twin screw extruder may be used. The extruder is not limited to the one shown in FIG. 1.

In production of the tube, the temperatures of a cylinder 11, an adaptor 12, a die head 13 and a die tip 14 of an extruder 10 are preferably set such that the resin temperature at the tip of the die 24 is controlled to 350 to 370° C. By controlling the resin temperature at the tip of the die 24 to a relatively low temperature, the amount of components volatilizing from the TFE/FAVE copolymer (polymer fume) can be suppressed, so that the contamination of the inner surface of the tube can be further suppressed. In the case where a pellet of the TFE/FAVE copolymer is used as molding material, by controlling the resin temperature at the tip of the die 24 lower than the molding temperature in production of the pellet, the amount of components volatilizing from the TFE/FAVE copolymer (polymer fume) can be further suppressed, so that the contamination of the inner surface of the tube can be further suppressed. In the case where the resin temperature at the tip of the die 24 is too low, molding defects may occur, resulting in damage to the appearance of the tube or increase in the surface roughness of the tube inner surface.

Even in the case where a tube with less amount of contamination in the tube inner surface is produced by such a method, the tube inner surface may be contaminated by contaminants in a gas during storage after production, so that it is also suitable to appropriately select the method for storing the tube. For example, by storing a tube with a high-purity liquid filled therein, contamination after production can be suppressed. Ultrapure water is preferred as the high-purity liquid filled inside the tube.

The outer diameter of the tube is not particularly limited, and may be 2 to 100 mm, or 5 to 50 mm. The thickness of the tube may be 0.1 to 10 mm, or 0.3 to 5 mm.

The tube of the present disclosure can be suitably used as a tube for piping of a chemical solution for flowing a chemical solution, and particularly suitably used as a tube for piping of a chemical solution, for transporting a high-purity chemical solution in production of semiconductor devices.

In a semiconductor plant, many tubes for flowing ultrapure water or high-purity chemical solution for use in production of semiconductor devices are used. The tube inner surface may be contaminated by contaminants such as fine particles present in the air and polymer fume generated during melt molding of a TFE/FAVE copolymer. In particular, since nano-size contaminants adhere to the inner surface of a polymer due to van der Waals force or electrostatic force, removal using cleaning water such as pure water is difficult. Accordingly, in the case where a new tube is used in a semiconductor plant, there exist problems such as requirement of a large amount of ultrapure water or chemical solution and requirement of cleaning for a long time in order to perform cleaning (flushing) of the internal part of the tube.

With the constitution described above, the tube of the present disclosure allows contaminants to barely adhere to the inner surface, so that the ultrapure water and high-purity chemical solution for use in production of semiconductor devices are barely contaminated. Due to having such an effect, the tube of the present disclosure is preferably a tube for piping of a chemical solution, for flowing the chemical solution. Examples of the chemical solution include a chemical solution for use in production of semiconductors, for example, a chemical solution such as ammonia water, ozonated water, hydrogen peroxide water, hydrochloric acid, sulfuric acid, a resist solution, a thinner solution and a developing solution.

The tube of the present disclosure can be used, for example, as a tube for use in semiconductor production facilities or semiconductor production apparatuses such as a chemical solution supply line for semiconductor production, chemical solution supply equipment for semiconductor production, a semiconductor cleaning unit, and a coater developer. By using the tube of the present disclosure in semiconductor production facilities or semiconductor production apparatuses, a high-purity chemical solution can be surely supplied to a use point. By using the tube of the present disclosure, even in the case where a semiconductor device having a line width of 5 nm or less is produced, defects of a semiconductor device caused by particles or metal contaminants can be reduced, so that yield improvement in semiconductor production can be expected.

While embodiments have been described above, it is to be understood that various changes in the embodiments and details can be made without departing from the spirit and scope of the following claims.

The present disclosure provides a tube containing a tetrafluoroethylene/fluoroalkyl vinyl ether copolymer, wherein the tube inner surface has a surface roughness Ra of 5 nm or less measured by atomic force microscopy (AFM) with an evaluation length set to 3 μm, and the tube has an amount of metals eluted from the tube inner surface of 0.30 ng/cm$^2$ or less.

In the tube of the present disclosure, the tube inner surface preferably has an average spherulite size of 1 to 150 μm.

In the tube of the present disclosure, the tube inner surface preferably has an average spherulite size of more than 15 μm.

The fluoroalkyl vinyl ether of the tube of the present disclosure is preferably perfluoro(propyl vinyl ether).

The tube of the present disclosure can be suitably used for transporting a high-purity chemical solution for manufacturing a semiconductor device.

The tube of the present disclosure is preferably obtained by extruding the tetrafluoroethylene/fluoroalkyl vinyl ether copolymer, while flowing a gas which has passed through a filter having a filtration accuracy of 5 nm or less into a hollow part of the tube extruded from the die equipped in an extruder.

In the tube of the present disclosure, the content of a fluoroalkyl vinyl ether unit in the tetrafluoroethylene/fluoroalkyl vinyl ether copolymer is preferably 1.0 to 8.0 mass % relative to the total monomer units.

The present disclosure also provides a method for producing the tube comprising, by using an extruder in which a die is equipped, extruding the tetrafluoroethylene/fluoroalkyl vinyl ether copolymer, while flowing a gas which has passed through a filter having a filtration accuracy of 5 nm or less into the hollow part of the tube extruded from the tip of the die.

In the production method of the present disclosure, a resin temperature of the tetrafluoroethylene/fluoroalkyl vinyl ether copolymer preferably at the tip of the die is 350 to 370° C.

The present disclosure also provides a method for storing the tube comprising storing the tube with a high-purity liquid filled inside the tube.

EXAMPLES

The embodiments of the present disclosure is described with reference to Examples as follows, though the present disclosure is not limited thereto only.

The values in Examples were measured by the following methods, respectively.

<Composition of Copolymer>

The contents of a tetrafluoroethylene (TFE) unit and a fluoroalkyl vinyl ether (FAVE) unit in a copolymer were measured by $^{19}$F-NMR method.

<Melt Flow Rate (MFR)>

The MFR of a pellet used in Examples and Comparative Examples was determined by the following method. In accordance with ASTM D1238, by using a melt indexer (manufactured by Yasuda Seiki Seisakusho, Ltd.), the mass of a copolymer flowing out from a nozzle having an inner diameter of 2.1 mm and a length of 8 mm under a load of 5 kg at 372° C. per 10 minutes (g/10 min) was determined.

<Melting Point>

The melting point of a pellet used in Examples and Comparative Examples was determined as the temperature corresponding to the maximal value in a heat-of-fusion curve during heating at a rate of 10° C./min using a differential scanning calorimeter (DSC).

<Specific Gravity>

The specific gravity of a pellet used in Examples and Comparative Examples was measured by underwater substitution.

<Tensile Breaking Strength (TS) and Tensile Elongation (EL)>

A pellet used in Examples and Comparative Examples was heat pressed to prepare a sheet having a thickness of 1.5 mm. Using an ASTM V-type dumbbell, the resulting sheet was cut out to prepare a dumbbell-shaped test piece. The tensile breaking strength and the tensile elongation at 25° C. of the dumbbell-shaped test piece were measured in accordance with ASTM D638 under conditions at 50 mm/min by using an autograph (AGS-J 5 kN, manufactured by Shimadzu Corporation).

<MIT Value>

From a pellet used in Examples and Comparative Examples, a test piece having a width of 12.5 mm, a length of 130 mm, and a thickness of 0.25 mm was prepared. The MIT value of the test piece thus made was measured in accordance with ASTM D2176. Specifically, the test piece was mounted on an MIT tester (model No. 12176, manufactured by Yasuda Seiki Seisakusho Co., Ltd.) and bent under conditions with a load of 1.25 kg, each of the left and right bending angles of 135 degrees, and a number of repeated bending of 175 cycles/min, for measurement of the number of repetitions until break of the test piece (MIT value).

<Average Spherulite Size and Maximum Spherulite Size>

A tube obtained by extrusion was cut into a length of approximately 2 cm, and then cut in the longitudinal direction to make a test piece having a length of approximately 5 mm and a width of 5 mm. An image of the test piece was photographed by a scanning electron microscope (SEM) with a magnification of 1000. From the image, the diameter of the spherulite was measured. The value obtained by an arithmetic means using the measured data of fifteen spherulites in total was taken as an average spherulite size. The maximum diameter of the 15 pieces was defined as the maximum spherulite size. Since a spherulite appears to be a distorted polygon due to collision to adjacently grown spherulites, the major axis length was defined as diameter.

<Surface Roughness Ra and Maximum Height (Rp–v)>

The surface roughness Ra is obtained as follows. A reference length L only is extracted from the roughness curve in the direction of the average line, and the absolute values of deviations from the average line to the measurement curve in the extracted portion are summed and averaged (arithmetic average roughness), and the obtained value by summed and averaged (arithmetic average roughness) is employed as the surface roughness Ra. In the case where the roughness curve is expressed by y=f(x) with an x-axis corresponding to the direction of the average line in the extracted portion and a y-axis corresponding to the direction of depth magnification, the calculation formula of the surface roughness Ra is as follows.

$$Ra = \frac{1}{L}\int_0^L |f(x)|dx \qquad \text{[Formula 1]}$$

For calculation of the surface roughness Ra, the AFM topographic image of the inner surface of the tube obtained in Examples and Comparative Examples was subjected to automatic inclination correction.

The maximum height (Rp–v) represents the sum of a distance Yp which is a distance from the average line extracted in a reference length L to the peak of mountain, the average line extracted in a reference length L being obtained by extracting from a roughness curve in the direction of the average line with the reference length L, and a distance Yv which is a distance from the average line extracted in the reference length L to the bottom of valley, i.e. Rp–v=Yp+Yv.

For calculation of the maximum height (Rp–v), the AFM topographic image of the inner surface of the tube obtained in Examples and Comparative Examples was subjected to automatic inclination correction.

As atomic force microscope (AFM) for measurement of the AFM topographic image, a high-precision, large-probe microscope unit AFM 5200S (manufactured by Hitachi High-Tech Corporation) in a dynamic force mode was used. The sample surface was measured under the following conditions. Measurement area: 3×3 μm square, scanning rate: 1 Hz, 256×256 divided in x-y direction, cantilever: SI-DF-20 (Si, f=134 kHz, C=16 N/m).

<Amount of Metal Eluted>

Each of the tubes obtained in Examples and Comparative Examples was cut into a length of 60 cm. The tube having a length of 60 cm was bent into an arc shape and fixed. Into the arc-shaped tube, ultrapure water in an amount equal to the internal capacity of the tube was injected. The ultrapure water was immediately discharged to wash the inner surface of the tube. Subsequently, from one end of the tube, 34 ml of 5 mass % $HNO_3$ aqueous solution (made by diluting "TAMAPURE" manufactured by Kanto Kagaku (68 mass % $HNO_3$) with ultrapure water) was gently injected by using a cleaned syringe. The nitric acid aqueous solution was left standing at room temperature for 4 hours and then collected. The amount of metal components contained in the collected nitric acid aqueous solution was measured by inductively coupled plasma mass spectrometry (ICP-MS). The amount of metals contained in the chemical solution used was defined as blank value. The value obtained by subtracting the amount of metals contained in the chemical solution used as the blank value from the detected value was employed as the measured value. The measured value (ng/ml) was multiplied by an amount of a filled liquid of 34 ml, and divided by a tube-liquid contact area of 160 $cm^2$ so as to determine the amount of metals eluted (ng/$cm^2$). Before use in the measurement, both of the ultrapure water and the nitric acid aqueous solution was passed through a filter having a filtration accuracy of 5 nm.

Example 1

A pellet containing a TFE/PPVE copolymer (having a content of PPVE unit of 5.5 mass % relative to the total monomer units) was subjected to extrusion at a drawing rate of 0.5 m/min using an extruder (cylinder shaft diameter: 30 mm, L/D=22), so that a tube having an outer diameter of 10.5 mm and an inner diameter of 8.5 mm was obtained. Through adjustment of the screw rotation speed of the extruder within a range from 5 to 10 rpm, the wall thickness of the tube was adjusted. In the extruder, the each temperature of cylinders (C1, C2 and C3), an adaptor (A), a die head (D1) and a die tip (D2) was set to 330 to 370° C. The resin temperature of the copolymer at the tip of the die (the tip of the die tip) was 370° C.

During extrusion, the air was allowed to pass through a filter having a filtration accuracy of 5 nm and then introduced into the hollow part of the extruded tube through a gas inlet of the die tip of the extruder at a fixed flow rate.

Figure 2:
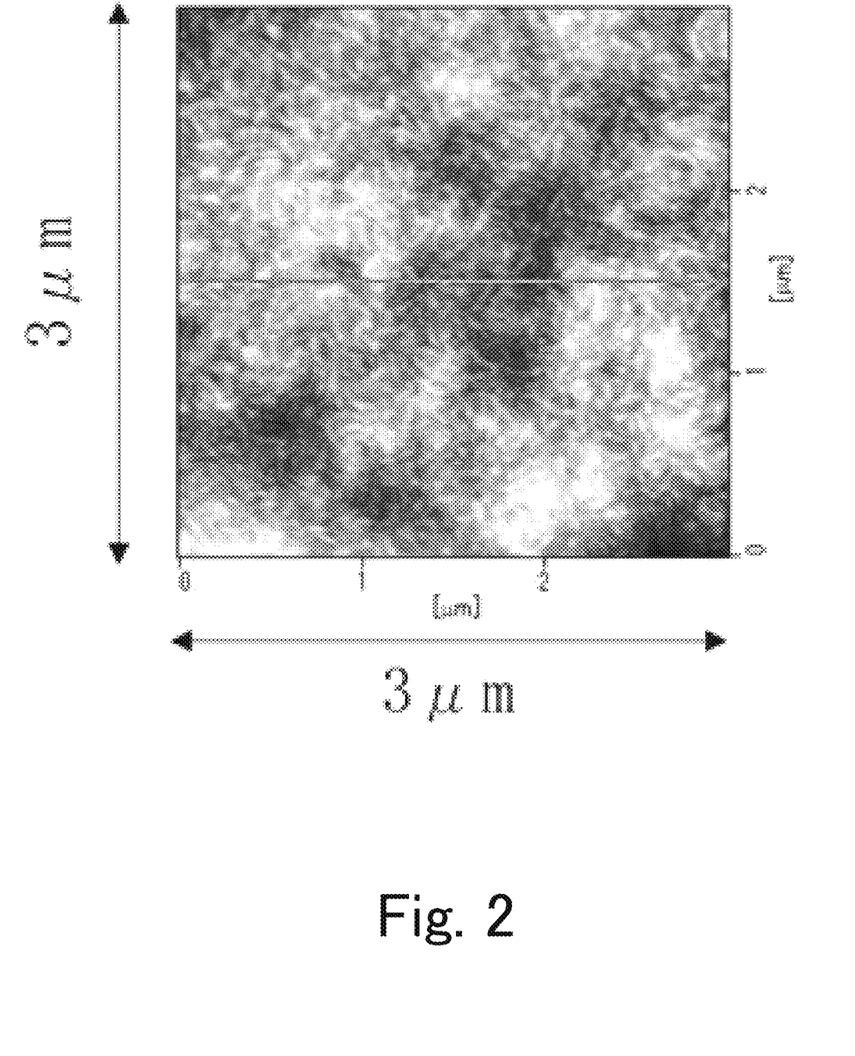
FIG. 2 is an atomic force microscope (AFM) topographic image of the inner surface of a tube prepared in Example 1 (evaluation length: 3 µm).
Figure 3:
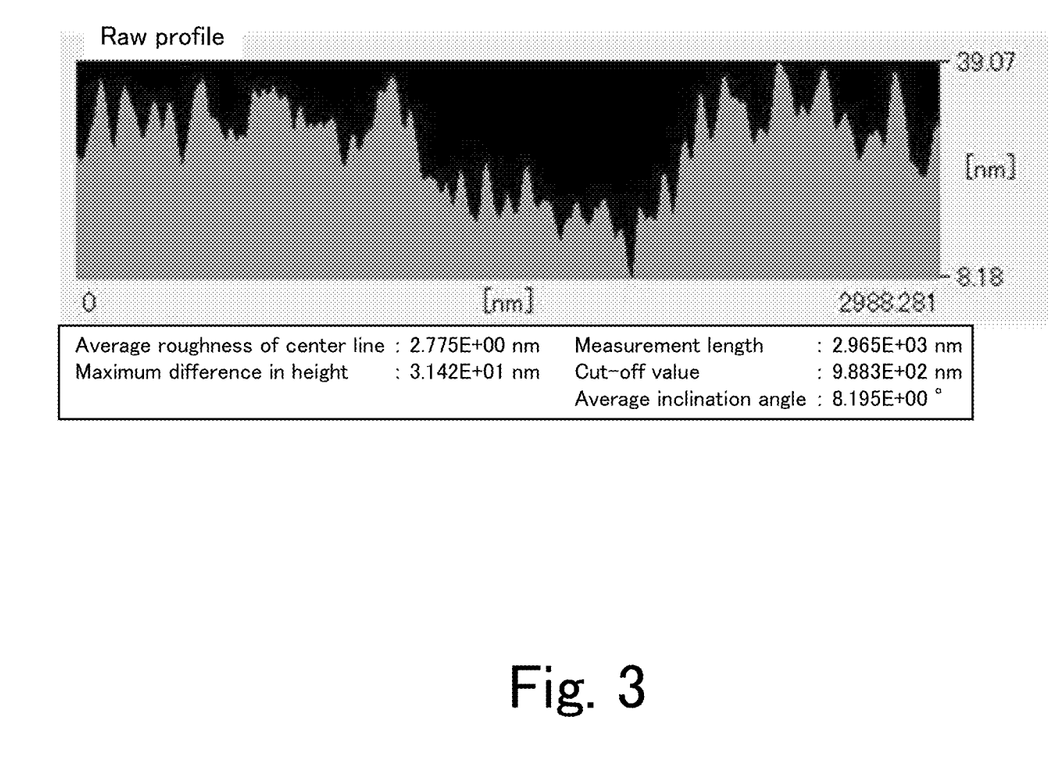
FIG. 3 is a roughness curve of the inner surface of a tube prepared in Example 1, calculated from the measurement data using atomic force microscopy (AFM).

In Table 2, composition of pellet, physical properties of pellet, physical properties of tube, and amount of metals eluted from tube inner surface are shown. In FIG. 2, an atomic force microscope (AFM) topographic image of the tube inner surface (evaluation length: 3 μm) is shown. In FIG. 3, a roughness curve of the tube inner surface, calculated from the measurement data by atomic force microscopy (AFM), is shown.

Example 2

A tube was prepared in the same manner as in Example 1, except that a pellet containing a TFE/PPVE copolymer (having a content of PPVE unit of 3.7 mass % relative to the total monomer units) and a PTFE (manufactured by Daikin Industries, Ltd., trade name "Lubron L5") was used. The results are shown in Table 2.

Example 3

A tube was prepared in the same manner as in Example 1, except that a pellet containing a TFE/PPVE copolymer (having a content of PPVE unit of 3.6 mass % relative to the total monomer units) was used. The results are shown in Table 2.

Comparative Example 1

A tube was prepared in the same manner as in Example 1, except that a pellet containing a TFE/PEVE copolymer (having a content of PEVE unit of 8.3 mass % relative to the total monomer units) and a PTFE (manufactured by Daikin Industries, Ltd., trade name "Lubron L5") was used. The results are shown in Table 2.

Comparative Example 2

A tube was prepared in the same manner as in Example 1, except that a pellet containing a TFE/PEVE copolymer (having a content of PEVE unit of 6.5 mass % relative to the total monomer units) was used. The results are shown in Table 2.

Comparative Example 3

A tube was prepared in the same manner as in Example 1, except that the air (external air) was directly introduced into the hollow part of the tube without using a filter. The results are shown in Table 2.

water, so that metals contained in the adhering contaminants were detected.

The results in Comparative Examples 1 and 2 show that even in the case where the air which has passed through a filter having a filtration accuracy of 5 nm is introduced into the hollow part of the tube, the amount of metals eluted cannot be insufficiently reduced in the case where the surface roughness Ra of the inner surface of the tube is large. The reason is presumed that the air which has passed through a filter having a filtration accuracy of 5 nm contains particulate contaminants having a particle size of less than 5 nm. The contaminants penetrated into the concave portions in the rough inner surface of the tube, and the contaminants penetrating into the concave portions were insufficiently removed by cleaning with ultrapure water, and the metals contained in the contaminants unable to be removed were detected. The contaminants adhering to the inner surface of the tube unable to be removed by cleaning with ultrapure water, however, have a small particle size, so that it is presumed that the amount of metals eluted was less than that in Comparative Example 3.

TABLE 2

|  | Example | | | Comparative Example | | |
|---|---|---|---|---|---|---|
|  | 1 | 2 | 3 | 1 | 2 | 3 |
| Pellet Copolymer | | | | | | |
| Type of FAVE | PPVE | PPVE | PPVE | PEVE | PEVE | PPVE |
| Content of FAVE (wt %) | 5.5 | 3.7 | 3.6 | 8.3 | 6.5 | 5.5 |
| Content of polymer in pellet | | | | | | |
| Content of copolymer (wt %) | 100 | 99 | 100 | 60 | 100 | 100 |
| Content of PTFE (wt %) | 0 | 1 | 0 | 40 | 0 | 0 |
| Physical property of pellet | | | | | | |
| MFR (g/10 min) | 2.0 | 1.9 | 1.8 | 2.6 | 2.5 | 2.0 |
| Melting point (° C.) | 304 | 309 | 310 | 281 | 285 | 304 |
| Specific gravity | 2.14 | 2.14 | 2.13 | 2.14 | 2.13 | 2.14 |
| TS(MPa) | 36 | 32 | 29 | 36 | 37 | 36 |
| EL(%) | 350 | 370 | 330 | 340 | 320 | 350 |
| MIT value (×1000) | 2300 | 1000 | 900 | 2000 | 2100 | 2300 |
| Molding condition of tube | | | | | | |
| Resin temperature (° C.) | 370 | | | | | |
| Air filter | Present | Present | Present | Present | Present | Absent |
| Tube | | | | | | |
| Average spherulite size (µm) | 15 | 5 | 30 | 4 | 7 | 15 |
| Maximum spherulite size (µm) | 20 | 10 | 45 | 7 | 12 | 20 |
| Surface roughness Ra (nm) | 2.8 | 2.8 | 2.7 | 5.9 | 6.2 | 2.8 |
| Maximum height Rp-v (nm) | 31 | 29 | 30 | 58 | 60 | 31 |
| Amount of metal eluted (ng/cm$^2$) | | | | | | |
| Na | 0.000 | 0.001 | 0.000 | 0.002 | 0.003 | 0.042 |
| Mg | 0.000 | 0.000 | 0.000 | 0.000 | 0.000 | 0.000 |
| Al | 0.004 | 0.007 | 0.004 | 0.011 | 0.008 | 0.042 |
| K | 0.001 | 0.000 | 0.000 | 0.028 | 0.034 | 0.042 |
| Ca | 0.057 | 0.059 | 0.051 | 0.102 | 0.110 | 0.170 |
| Fe | 0.076 | 0.065 | 0.064 | 0.191 | 0.212 | 0.765 |
| Total | 0.139 | 0.132 | 0.119 | 0.333 | 0.368 | 1.062 |

The results in Comparative Example 3 show that the air introduced into the hollow part of the tube which has not passed through a filter caused an extremely large amount of metals eluted. The reason is presumed that contaminants contained in the air adhered to the tube inner surface and were insufficiently removed by cleaning with ultrapure water.

On the other hand, from the results in Examples 1 to 3, it is shown that in the case where the surface roughness Ra of the inner surface of the tube is extremely small and the air which has passed through a filter having a filtration accuracy of 5 nm is introduced into the hollow part of the tube during extrusion, the metals derived from contaminants are barely eluted from the tube inner surface. The reason is presumed as follows. The removal of contaminants having a relatively large particle size from the air introduced into the hollow part allows no contaminants having a relatively large particle size to adhere to the inner surface of the tube. Further, since the concave portions present in the tube inner surface are small, contaminants having a relatively small particle size barely penetrate into the concave portions, and even in the case where there exist contaminants penetrating therein, the contaminants are removed by cleaning with ultrapure water.

Further, the tube in Example 1 has a larger average spherulite size in comparison with the tube in Example 2. The amount of metals eluted from the tube inner surface in Example 1, however, is equivalent to the amount of metals eluted from the tube inner surface in Example 2. The reason is presumed as follows. In FIG. 4 to FIG. 7, electron micrographs and roughness curves of the tube inner surface in Examples 1 and 2 are shown.

Figure 4:
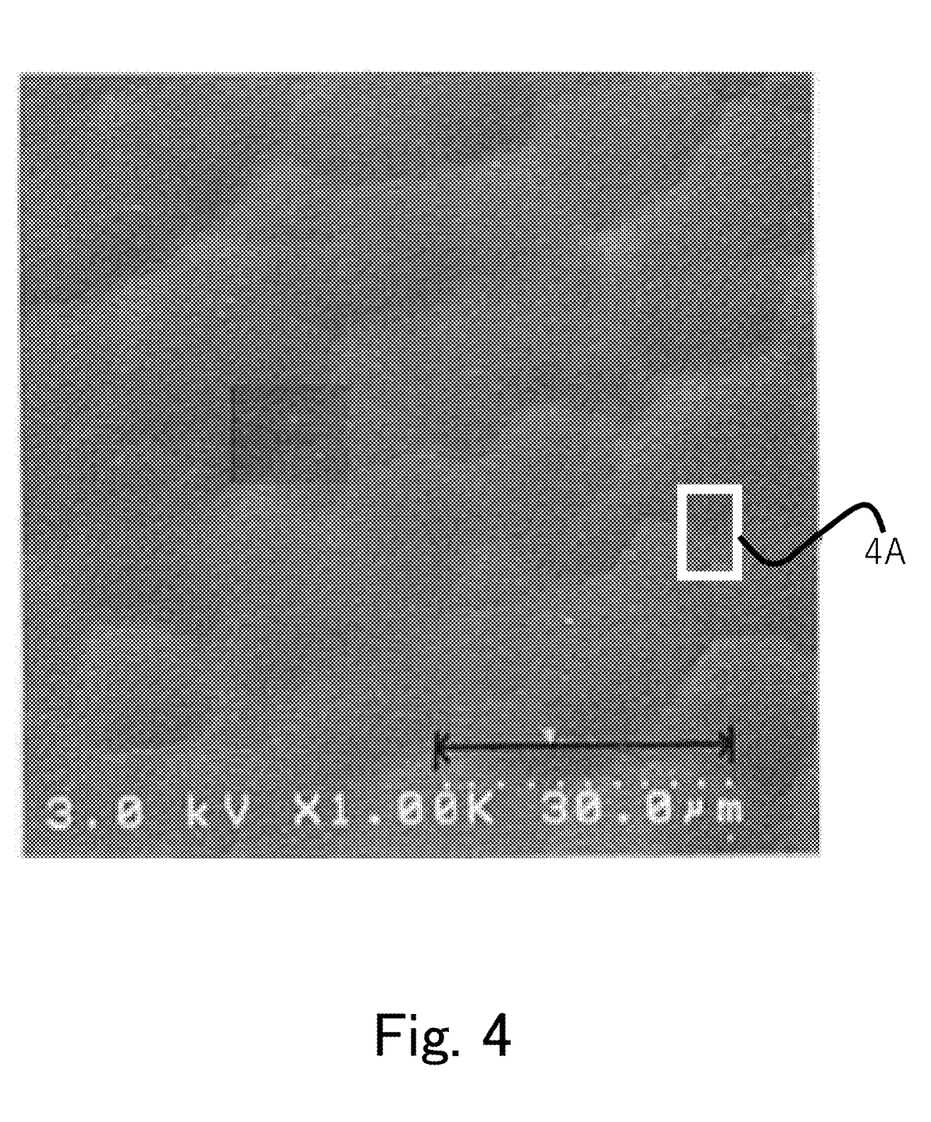
FIG. 4 is an electron micrograph of the inner surface of a tube prepared in Example 1.
Figure 5:
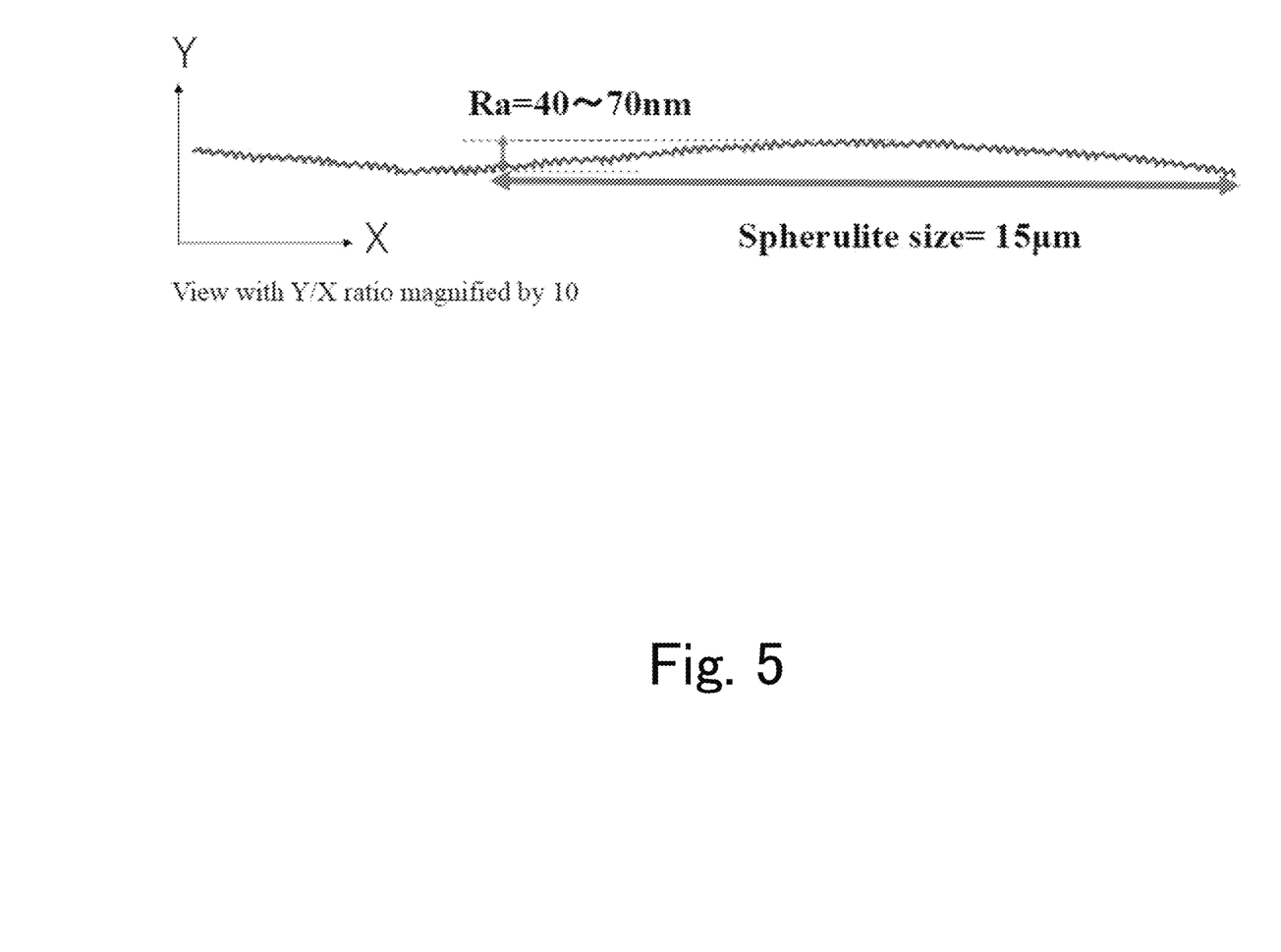
FIG. 5 is an image of roughness curve of the inner surface of a tube prepared in Example 1 with the Y-axis enlarged by 10 relative to the X-axis (depth magnification), based on the surface roughness Ra data measured in accordance with JIS standard (B0601) by using a contact-type surface roughness tester manufactured by Mitutoyo Corporation and the average spherulite size determined from the electron micrograph.
Figure 6:
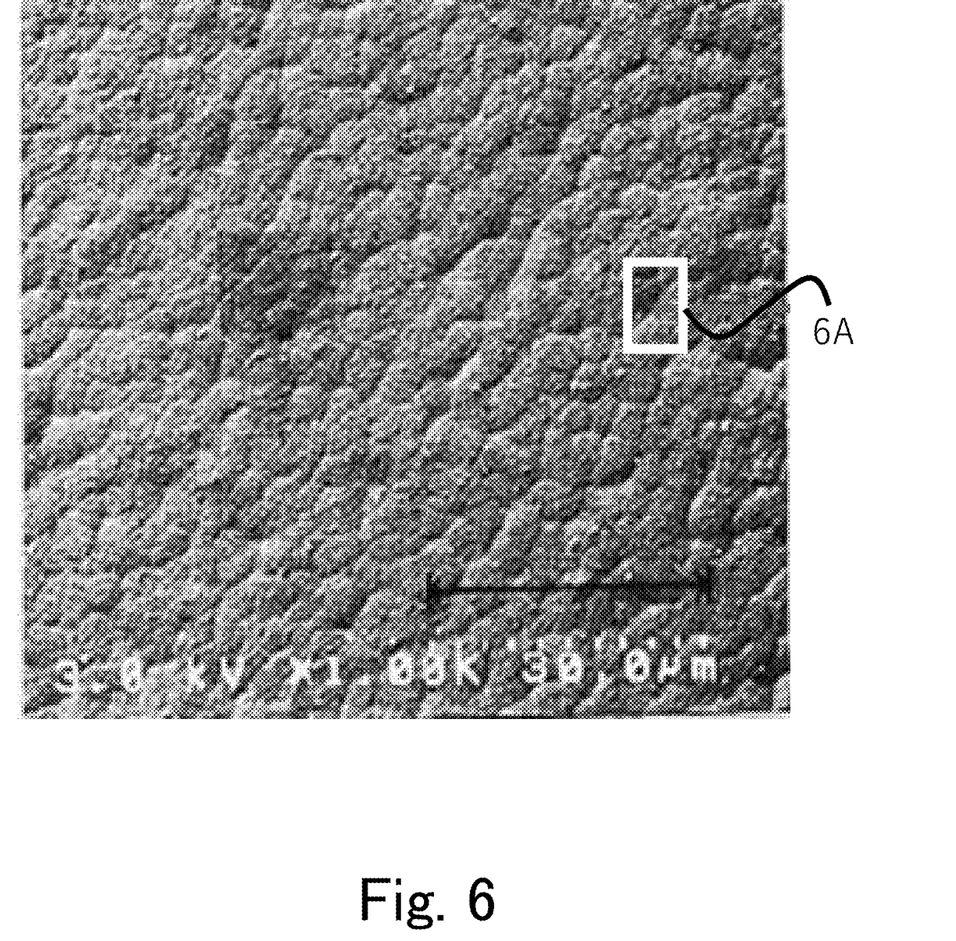
FIG. 6 is an electron micrograph of the inner surface of a tube prepared in Example 2.

FIG. 4 is an electron micrograph of the inner surface of a tube prepared in Example 1, and FIG. 6 is an electron micrograph of the inner surface of a tube prepared in Example 2. As shown in FIG. 4 and FIG. 6, the spherulite size in the tube inner surface is greatly different between Examples 1 and 2. As shown in the roughness curves in FIG. 5 and FIG. 7, however, both in the case where the spherulite size is large as in Example 1 and in the case where the spherulite size is small as in Example 2, the boundary between spherulites has no groove, being flat and smooth. It is barely conceivable that contaminants having a relatively small particle size adhere to the boundary between spherulites concentratedly. Accordingly, the spherulite size in the inner surface of the tube rarely affects the amount of metals eluted.

Figure 4A:
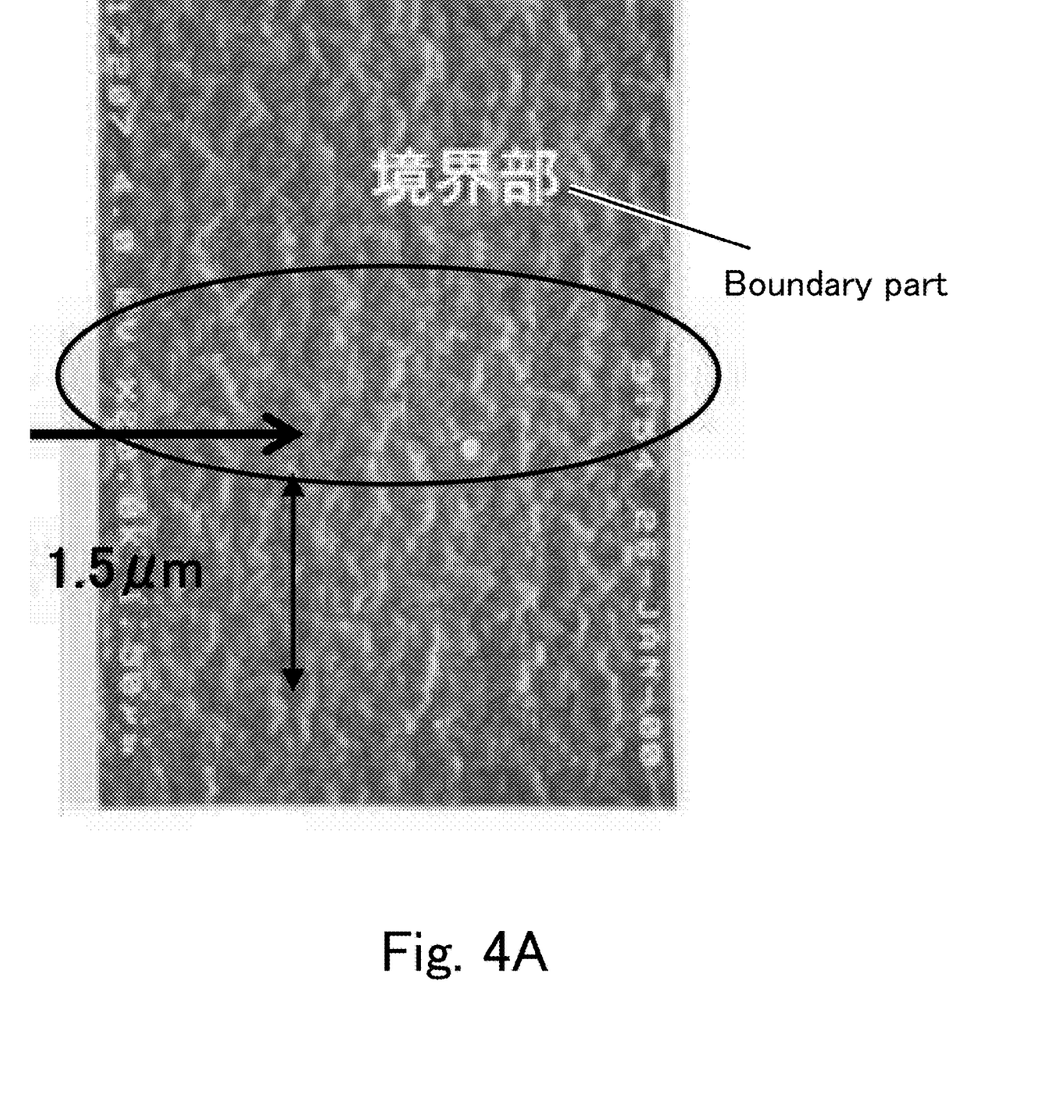
FIG. 4A is an electron micrograph in which a region 4A including a boundary part between spherulites in the electron micrograph in FIG. 4 is enlarged.
Figure 6A:
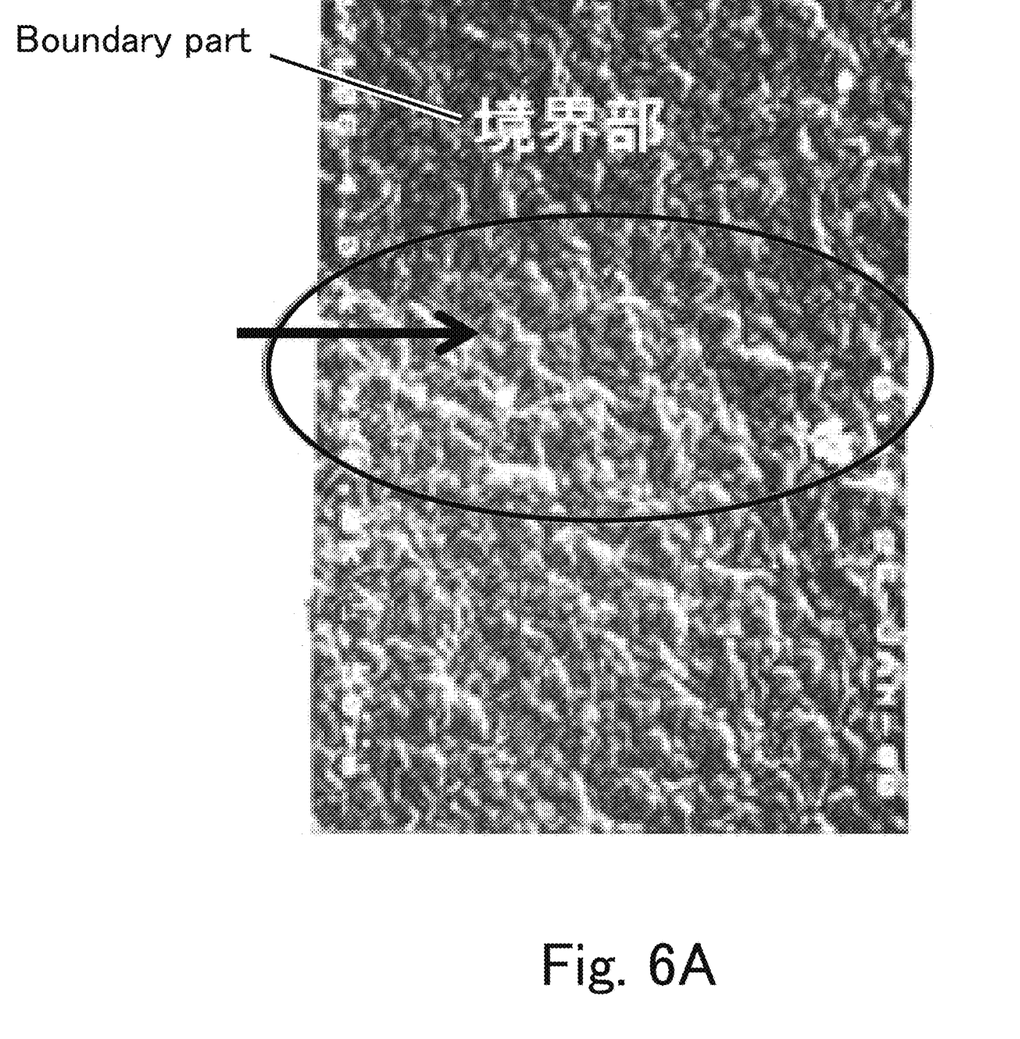
FIG. 6A is an electron micrograph of an enlarged region 6A including a boundary part between spherulites in the electron micrograph in FIG. 6.
Figure 7:
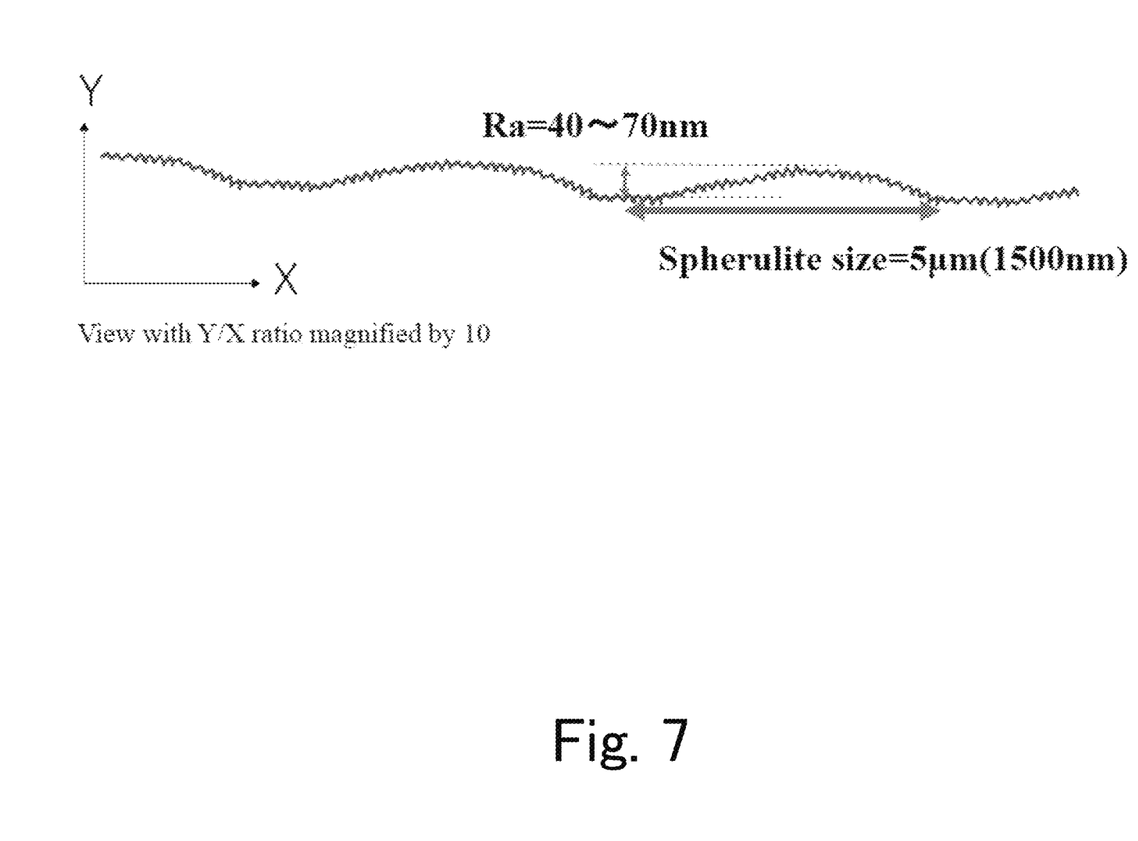
FIG. 7 is an image of roughness curve of the inner surface of a tube prepared in Example 2 with the Y-axis enlarged by 10 relative to the X-axis (depth magnification), based on the surface roughness Ra data measured in accordance with JIS standard (B0601) by using a contact-type surface roughness tester manufactured by Mitutoyo Corporation and the average spherulite size determined from the electron micrograph.

On the other hand, as shown in the roughness curves in FIG. 5 and FIG. 7, and electron micrographs in FIG. 4A and FIG. 6A, any of the inner surfaces of the tube has irregularities with a size far smaller than that of the spherulites. The surface roughness Ra in the present disclosure is measured by AFM, with an evaluation length being set to 3 µm. Accordingly, the surface roughness Ra in the present disclosure is not an index of the roughness formed by the spherulites in the tube inner surface, but rather an index of the roughness formed by fine irregularities shown in the roughness curves in FIG. 5 and FIG. 7. The factor that affects the amount of metals eluted is not the size of the spherulites but rather the surface roughness Ra, which is far smaller than the spherulite size. It is presumed that the tubes in Examples 1 and 2 had the same surface roughness Ra, so that the amounts of metals eluted were at the same level.

The results in Examples 1 and 2 show that the size of the spherulites appearing in the tube inner surface has almost no relation with the amount of metals eluted. As obvious from the results of Examples 1 to 3, it is important to use a clean gas during extrusion and to smoothen the inner surface of the tube to a nanometer level in order to reduce the amount of metals eluted.

REFERENCE SIGNS LIST

10: EXTRUDER
11: CYLINDER
12: ADAPTOR
13: DIE HEAD
14: DIE TIP
15: SCREW
16: TFE/FAVE COPOLYMER
17: SIZING DIE
18: TUBE INNER SURFACE
19: HOLLOW PART
21: GAS (EXTERNAL AIR)
22: FILTER
23: GAS INLET
24: LEADING END PORTION OF DIE

The invention claimed is:

1. A tube comprising a tetrafluoroethylene/fluoroalkyl vinyl ether copolymer,
   wherein the tube inner surface has a surface roughness Ra of 5 nm or less measured by atomic force microscopy (AFM) with an evaluation length set to 3 µm, and
   the tube has an amount of metals eluted from the tube inner surface of 0.30 ng/cm$^2$ or less.

2. The tube according to claim 1, wherein the tube inner surface has an average spherulite size of 1 to 150 µm.

3. The tube according to claim 1, wherein the tube inner surface has an average spherulite size of more than 15 µm.

4. The tube according to claim 1, wherein the fluoroalkyl vinyl ether is perfluoro(propyl vinyl ether).

5. The tube according to claim 1, wherein the tube is used for transporting a high-purity chemical solution for manufacturing a semiconductor device.

6. The tube according to claim 1, wherein the tube is obtained by extruding the tetrafluoroethylene/fluoroalkyl vinyl ether copolymer, while flowing a gas which has passed through a filter having a filtration accuracy of 5 nm or less into a hollow part of a tube extruded from the die equipped in an extruder.

7. The tube according to claim 1, wherein the content of a fluoroalkyl vinyl ether unit in the tetrafluoroethylene/fluoroalkyl vinyl ether copolymer is 1.0 to 8.0 mass % relative to the total monomer units.

8. A method for producing the tube according to claim 1, comprising, by using an extruder in which a die is equipped, extruding the tetrafluoroethylene/fluoroalkyl vinyl ether copolymer, while flowing a gas which has passed through a filter having a filtration accuracy of 5 nm or less into a hollow part of a tube extruded from the tip of the die.

9. The production method according to claim 8, wherein a resin temperature of the tetrafluoroethylene/fluoroalkyl vinyl ether copolymer at the tip of the die is 350 to 370° C.

10. A method for storing the tube according to claim 1, comprising storing the tube with a high-purity liquid filled inside the tube.

* * * * *